US005864353A

United States Patent [19]

Gila et al.

[11] Patent Number: 5,864,353

[45] Date of Patent: Jan. 26, 1999

[54] C/A METHOD OF CALIBRATING A COLOR FOR MONOCHROME ELECTROSTATIC IMAGING APPARATUS

[75] Inventors: Omer Gila, Rehovot; Ilan Kander, Ranaana; Pini Perlmutter, Rishon Le Zion; Dvir Harmelech, Rehovot, all of Israel

[73] Assignee: Indigo N.V., SM Veldhoven, Netherlands

[21] Appl. No.: 383,426

[22] Filed: Feb. 3, 1995

[51] Int. Cl.[6] ........................... B41J 2/385; G03G 15/01; G01D 15/06

[52] U.S. Cl. ........................................... 347/131; 347/115

[58] Field of Search .................................... 347/131, 115, 347/140, 151, 240, 253, 254; 358/298, 456; 355/256; 399/72, 48, 181, 42

[56] References Cited

U.S. PATENT DOCUMENTS

| | | | |
|---|---|---|---|
| 4,377,338 | 3/1983 | Ernst | 399/49 |
| 4,680,646 | 7/1987 | Ikeda et al. | 347/131 |
| 4,794,651 | 12/1988 | Landa et al. | 430/110 |
| 4,839,722 | 6/1989 | Barry et al. | 358/523 |
| 4,965,634 | 10/1990 | Bando | 399/49 |
| 4,985,732 | 1/1991 | Landa et al. | 399/238 |
| 5,047,808 | 9/1991 | Landa et al. | 399/308 |
| 5,070,413 | 12/1991 | Sullivan et al. | 358/456 |
| 5,083,160 | 1/1992 | Suzuki et al. | 399/39 |
| 5,089,856 | 2/1992 | Landa et al. | 399/308 |
| 5,117,263 | 5/1992 | Adam et al. | 399/233 |
| 5,255,058 | 10/1993 | Pinhas et al. | 399/348 |
| 5,258,810 | 11/1993 | Bresina et al. | 399/72 |
| 5,262,825 | 11/1993 | Nordeen et al. | 399/48 |
| 5,280,326 | 1/1994 | Pinhas et al. | 399/296 |
| 5,289,238 | 2/1994 | Lior et al. | 399/249 |
| 5,390,004 | 2/1995 | Hopkins | 399/42 |
| 5,508,790 | 4/1996 | Belinkov et al. | 399/161 |

FOREIGN PATENT DOCUMENTS

| | | |
|---|---|---|
| 0071746 | 2/1983 | European Pat. Off. . |
| 0682294 | 11/1995 | European Pat. Off. . |
| 2212419 | 7/1989 | United Kingdom . |
| 90/14619 | 11/1990 | WIPO . |

*Primary Examiner*—N. Le
*Assistant Examiner*—L. Anderson
*Attorney, Agent, or Firm*—Greenblum & Bernstein P.L.C.

[57] ABSTRACT

A method of adjusting imaging apparatus including: (a) charging a photoreceptor surface to a first voltage; (b) selectively discharging portions of the charged photoreceptor surface, with a beam of electromagnetic energy such as a laser beam or LED output, having a controllable power, to form a predefined electrostatic latent test image on the photoreceptor surface; (c) developing, using a second voltage different from the first voltage, a layer of charged toner particles onto the selectively discharged portions of the photoreceptor surface, thereby providing a developed test image corresponding to the latent test image; (d) measuring the apparent optical density of portions of the developed test image, including a solid print portion and a predetermined gray level portion; (e) comparing the measured solid and gray level optical densities with predetermined, desired, solid and gray level optical densities; and (f) adjusting the second voltage and the power of the laser beam based on the comparison between the measured and desired solid and gray level optical densities.

19 Claims, 7 Drawing Sheets

C/A METHOD OF CALIBRATING A COLOR FOR MONOCHROME ELECTROSTATIC IMAGING APPARATUS

FIELD OF THE INVENTION

The present invention relates to calibration of electrostatic imaging apparatus and, more particularly, to an improved calibration method suitable for color as well as monochrome imaging apparatus.

BACKGROUND OF THE INVENTION

A substantial number of factors affect the stability and calibration of electrophotographic imaging equipment such as printers and copiers. In general, a number of voltages are controlled to produce the required image density and other required properties. Such voltages include a voltage for charging a photoreceptor on which a latent image is formed, such as a roller voltage, a corotron voltage or a scorotron voltage. The voltage of the developer, both for liquid and powder toner development, is also controlled. Furthermore, control of the intensity of light used for selective discharge of the photoreceptor in forming the latent image is also important in optimal formation of the latent image. In laser printers, the intensity of light is controlled through control of laser power.

Repetitive use of the imaging apparatus requires systematic, gradual, changes in some of the factors mentioned above, such as the charge and discharge voltages of the photoreceptor to preserve proper operation of the system, while other factors are not dependent on time or the environment of the imaging apparatus.

Direct control of the physical parameters of the imaging apparatus has proven to be inadequate. Therefore, calibration methods are generally used for controlling the color of the printed image.

As known in the art, the color density of the final image generally depends on two factors, namely the optical density (OD) of solid printing and a look up table (LUT) of the imaging apparatus. The LUT is adapted to compensate mainly for the dot gain of the imaging apparatus, i.e. the difference between the actual, printed, dot area and the dot area defined by the corresponding digital input.

According to one known calibration technique, one of the voltages mentioned above is varied manually in accordance with variations in the solid optical density (OD) of the final image. For example, the voltage between the photoreceptor and the developer roller, also referred to as the "brightness voltage", may be varied in accordance with the solid OD of the final image. However, since the brightness voltage has an effect on the gray level density balance of the final image, this technique is insufficiently accurate for high quality printing.

Density-balance inaccuracies are particularly crucial in color printing, where the balance between colors is extremely sensitive to density balances within the different base colors, e.g. cyan, magenta, yellow and black. Therefore, complex calibration procedures, in which comprehensive adjustments are performed, must be frequently carried out on the imaging apparatus. Existing calibration procedures, which generally include the derivation of a new LUT, are highly time consuming, typically taking a few hours to perform.

Examples of existing calibration techniques are described in U.S. Pat. Nos. 4,839,722, 5,070,413, 5,258,810 and 5,262,825.

SUMMARY OF THE INVENTION

It is therefore an object of the present invention to provide imaging apparatus, particularly digital color printing apparatus, using an improved color adjustment system which yields improved color stability in the printed image, without the need to derive a new LUT during routine calibration. The present invention is adapted particularly for a "write black" system, in which toned portions of the final image correspond to selectively discharged portions of a photoreceptor surface of the apparatus.

The present invention utilizes the fact that short-term color instabilities in electrophoretic imaging are due primarily to changes in the optical density of solid printing (hereinafter "solid OD") and to changes in the appropriate look up table, which may be a LUT corresponding to the net dot gain of the printer for uncorrected digital images, or a LUT corresponding to the dot gain of the printer for inputs corresponding to cromalin-corrected digital images. The solid OD of a given color controls the density of the given color in the final image while the LUT controls the gray level distribution of the given color in the final image. Instabilities in both the solid OD and the LUT are caused by instabilities in physical parameters of the imaging apparatus, such as temperature, charging and discharging voltages of a photoreceptor and toner parameters such as toner conductivity.

The present inventors have found that the solid OD and the LUT of a laser printer can be effectively controlled by controlling only two printer parameters, namely laser power and brightness, i.e. development, voltage. The brightness voltage is defined as the voltage on a developer, preferably a developer roller, relative to the voltage on the photoreceptor surface.

Control of both the laser power and the brightness voltage has been found to be an effective and efficient method of controlling color, since the brightness voltage controls primarily the solid OD, with some effect on the LUT, while the laser power, once it is above a full exposure point, controls essentially only the LUT, through control of the dot gain, with a negligible effect on the solid OD. It has been found that, uncorrected, the solid OD may vary by over 30 percent over a period of a few weeks and the apparent optical density may vary by over 20 percent at a gray level of 50 percent, i.e. at a 50 percent dot area input, over the same period.

It has been also found by the present inventors that the optical density of the 50 percent gray level is highly representative of the gray level balance of the final image, provided that the solid OD is maintained at a substantially constant level. Control of the 50 percent gray level optical density provides particularly sensitive control of the effective LUT since, typically, the highest dot gain, i.e. the difference between the actual dot area and the dot area according to the digital input, is approximately at the 50 percent gray level. While it is preferable to control the optical density at the 50% gray level, control of other gray level values can also result in improved apparent LUT.

The present invention therefore comprises the use of a relatively quick, optionally automatic, correction procedure, including measurement of both the solid OD, i.e. the optical density of solid printing, and the effective OD of the 50 percent gray level of each color of the final image and, preferably automatic, adjustment of the laser power and the brightness voltage for each color in accordance with the measured densities.

Since the laser power level has only a minor effect on the solid OD, in one preferred embodiment of the invention, LUT adjustment using laser power correction is preferably performed after the solid OD has been adjusted by correcting the brightness voltage, which typically changes the LUT as well as the solid OD.

This preferred embodiment of the present invention preferably further provides an iterative adjustment procedure, wherein a predetermined number of correction procedures as described are carried out sequentially. The solid OD and the OD of 50 percent gray of each color of the final image are measured after carrying out each correction procedure, and a new correction procedure is carried out based on new values of the laser power and the brightness voltage. Alternatively, in a preferred embodiment, the number of correction procedures is not fixed but, rather, the iterative adjustment procedure is terminated when changes in the solid OD and the OD of 50 percent gray, of each color, drop below a predetermined threshold.

In an alternative preferred embodiment of the invention, both the brightness voltage and the power correction are performed simultaneously. In this embodiment the partial derivatives of the 50% gray level OD and of the solid OD with respect to the changes in the brightness voltage and power are used to form a set of two equations in two unknowns, namely the desired change in brightness voltage and laser power correction. These equations are solved and the calculated corrections are made. Preferably, the procedure is repeated until a desired level of accuracy is achieved.

Some aspects of the present invention can be thought of as adjusting the printing system to match the original calibration curve (LUT) of the system. This differs from conventional system calibration in which the LUT of the system is changed to compensate for physical changes in the system. In these aspects of the present invention once a given image has been converted to a bit mode representation suitable for half-tone printing, recalibration of the system according to the presnt invention does not require reconversion to bit mode. On the other hand, with prior art recalibration involving generation of a new LUT, all images must be reconverted to bit mode according to the new LUT.

While the invention is most useful in a printer system, the general principle of the invention is also applicable to a copier system. In such a system, a test sheet comprising a portion having a continuous tone gray level of 50% (or some other suitable gray level) and a portion having a full density portion are imaged. This image is scanned and half-tone printed by the copier. Based on the measured ODs of the printed image, the brightness voltage and the laser power are adjusted as described above.

Furthermore, the invention is also applicable to systems which use other means for discharging the photoreceptor to form the latent image. For example, in systems which use a LED discharge mechanism, the power output of the LED is changed instead of the laser power.

In addition, it is often required to make small changes in the gray level curve without changing the solid OD. Such a requirement occurs, for example, when an image has been bit mapped to a LUT which is different from that in the printer. In such a case, the tonal quality of the image may be somewhat different, affecting for example, the flesh tones of the printed images. Changes in the 50% gray level of one or more of the colors can be used to compensate for this effect. Preferably, the above-mentioned desired set of equations is solved, where the desired changes in the gray level OD are entered instead of the errors in gray level OD and solid OD. In particular, the solid OD change is generally zero.

There is thus provided in accordance with a preferred embodiment of the invention, a method of adjusting imaging apparatus including:

(a) charging a photoreceptor surface to a first voltage;

(b) selectively discharging portions of the charged photoreceptor surface, with a laser beam having a controllable power, to form a predefined electrostatic latent test image on the photoreceptor surface;

(c) developing, using a second voltage different from the first voltage, a layer of charged toner particles onto the selectively discharged portions of the photoreceptor surface, thereby providing a developed test image corresponding to the latent test image;

(d) measuring the apparent optical density of portions of the developed test image, including a solid print portion and a predetermined gray level portion;

(e) comparing the measured solid and gray level optical densities with predetermined, desired, solid and gray level optical densities; and (f) adjusting the second voltage and the power of the laser beam based on the comparison between the measured and desired solid and gray level optical densities.

In a preferred variation of this embodiment of the invention, the method further includes:

(g) repeating (a)–(f) until the differences between the measured and the desired solid and gray level optical densities drop under preselected, respective, thresholds.

In accordance with a further preferred embodiment of the invention, there is provided a method of adjusting imaging apparatus including:

(a) charging a photoreceptor surface to a first voltage;

(b) selectively discharging portions of the charged photoreceptor surface, with a laser beam having a controllable power, to form a predefined electrostatic latent test image on the photoreceptor surface;

(c) developing, using a second voltage different from the first voltage, a layer of charged toner particles onto the selectively discharged portions of the photoreceptor surface, thereby providing a developed test image corresponding to the latent test image;

(d) measuring the apparent optical density of a solid print portion of the developed test image;

(e) comparing the measured solid optical density with a predetermined, desired, solid optical density;

(f) if the difference between the apparent solid optical density and the desired solid optical density is above a preselected threshold:

(f1) adjusting the second voltage according to the difference between the apparent solid optical density and the desired solid optical density; and (f2) repeating (a)–(f);

(g) measuring the apparent optical density of a predetermined gray level portion of the developed test image;

(h) comparing the measured predetermined gray optical density with a predetermined, desired, predetermined gray optical density; and (i) if the difference between the apparent predetermined gray optical density and the desired predetermined gray optical density is above a preselected threshold;

(i1) adjusting the second voltage according to the difference between the apparent predetermined gray optical density and the desired predetermined gray optical density; and (i2) repeating (a)–(i).

In accordance with yet a further preferred embodiment of the present invention, there is provided a method of adjusting imaging apparatus including a photoreceptor surface charged to a first voltage, a laser scanner having a controllable output power which selectively discharges portions of the charged photoreceptor surface to form an electrostatic latent test image thereon and a developer, engaging the photoreceptor surface and charged to a second voltage different from the first voltage, which provides a layer of charged toner particles onto the selectively discharged portions of the photoreceptor surface, thereby forming a developed test image corresponding to the latent test image, the method including:

(a) measuring the apparent optical density of portions of the developed test image, including a solid print portion and a predetermined gray level portion;

(b) comparing the measured solid and gray level optical densities with predetermined, desired, solid and gray level optical densities; and (c) adjusting the second voltage and the power output of the laser scanner based on the comparison between the measured and desired solid and gray level optical densities.

In a preferred variation of this embodiment of the invention, the method further includes:

(d) repeating (a)–(c) until the differences between the measured and the desired solid and gray level optical densities drop under preselected, respective, thresholds.

In a preferred embodiment of the invention, measuring the apparent optical density comprises measuring the apparent optical density on the photoreceptor.

According to some embodiments of the present invention, the method further includes transferring at least a substantial portion of the developed test image from the photoreceptor surface onto a further substrate. Preferably, in such embodiments, measuring the apparent optical density comprises measuring the apparent optical density on the further substrate. The further substrate may be a final substrate or the surface of an intermediate transfer member.

In a preferred embodiment of the present invention, the predetermined gray level includes a 50 percent input gray level.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
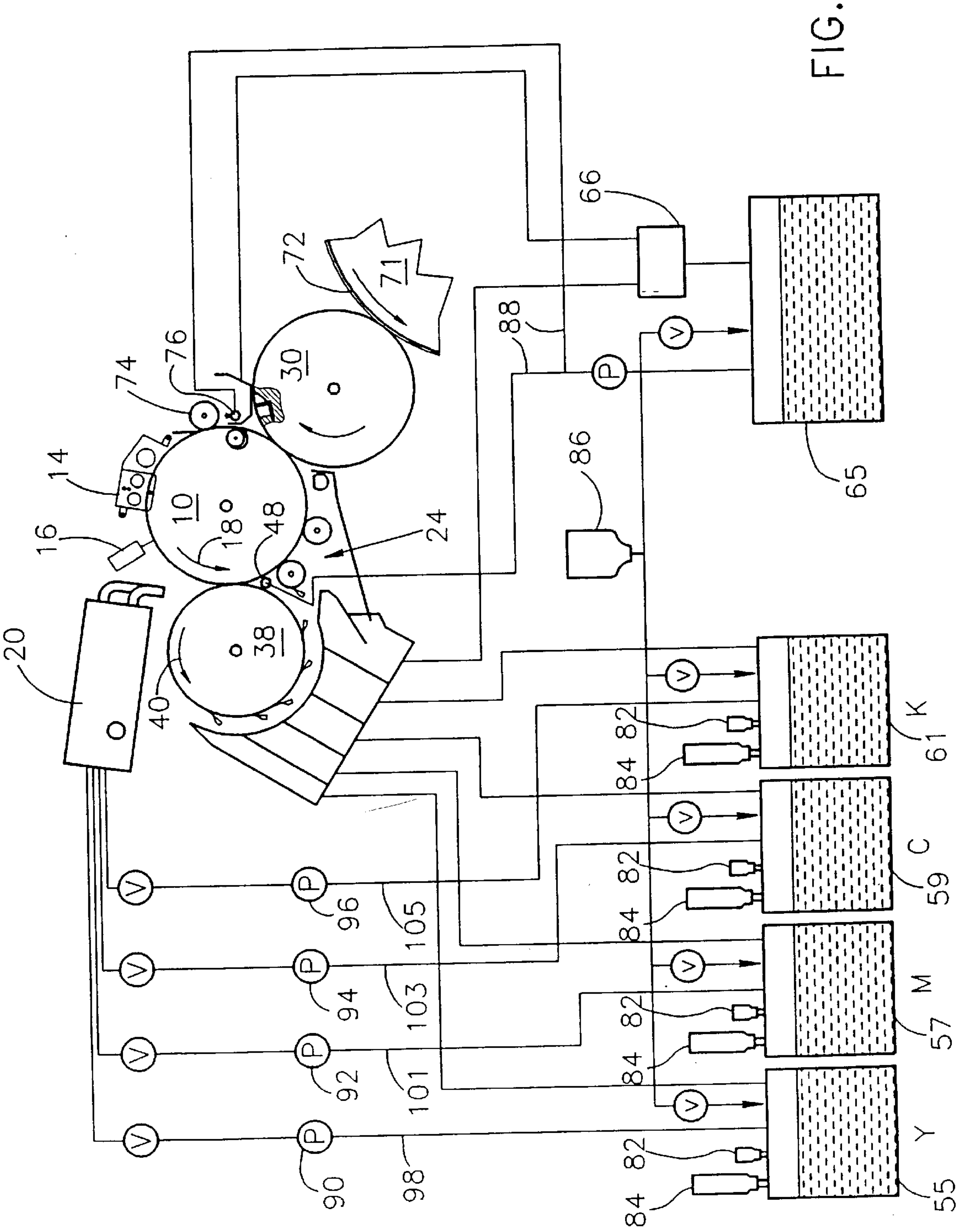
FIG. 1 is a simplified sectional illustration of electrostatic imaging apparatus constructed and operative in accordance with a preferred embodiment of the present invention.
Figure 2:
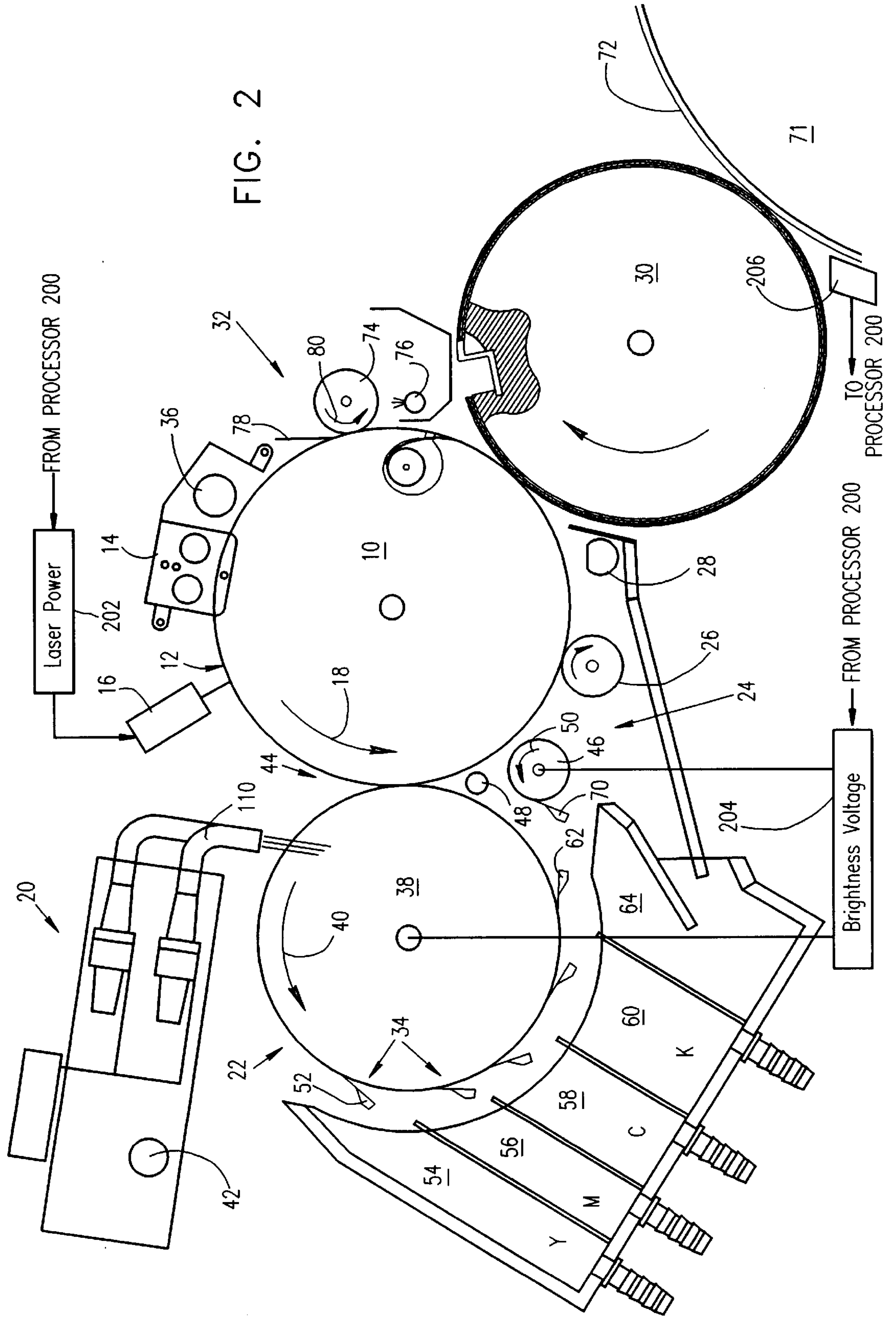
FIG. 2 is a simplified enlarged sectional illustration of the apparatus of FIG. 1.

Reference is now made to FIGS. 1 and 2 which illustrate a multicolor electrostatic imaging system constructed and operative in accordance with a preferred embodiment of the present invention. As seen in FIGS. 1 and 2 there is provided an imaging sheet, preferably an organic photoreceptor 12, typically mounted on a rotating drum 10. Drum 10 is rotated about its axis by a motor or the like (not shown), in the direction of arrow 18, past charging apparatus 14, preferably a corotron, scorotron or roller charger or other suitable charging apparatus as are known in the art and which is adapted to charge the surface of sheet photoreceptor 12. The image to be reproduced is focused by an imager 16 upon the charged surface 12 at least partially discharging the photoconductor in the areas struck by light, thereby forming the electrostatic latent image. Thus, the latent image normally includes image areas at a first electrical potential and background areas at another electrical potential.

Photoreceptor sheet 12 may use any suitable arrangement of layers of materials as is known in the art, however, in the preferred embodiment of the photoreceptor sheet, certain of the layers are removed from the ends of the sheet to facilitate its mounting on drum 10.

This preferred photoreceptor sheet and preferred methods of mounting it on drum 10 are described in a copending application of Belinkov et al., IMAGING APPARATUS AND PHOTORECEPTOR THEREFOR, filed Sep. 7, 1994, assigned Ser. No. 08/301,775 now U.S. Pat. No. 5,508,790, the disclosure of which is incorporated herein by reference. Alternatively, photoreceptor 12 may be deposited on the drum 10 and may form a continuous surface. Furthermore, photoreceptor 12 may be a non-organic type photoconductor based, for example, on a compound of Selenium.

In a preferred embodiment of the present invention, imaging apparatus 16 is a modulated laser beam scanning apparatus, or other laser imaging apparatus such as is known in the art or a LED imaging apparatus as known in the art. The power output of scanning apparatus 16 is preferably controlled by a power supply 202 as described below.

Also associated with drum 10 and photoreceptor sheet 12, in the preferred embodiment of the invention, are a multicolor liquid developer spray assembly 20, a developing assembly 22, color specific cleaning blade assemblies 34, a background cleaning station 24, an electrified squeegee 26, a background discharge device 28, an intermediate transfer member 30, cleaning apparatus 32, and, optionally, a neutralizing lamp assembly 36.

Developing assembly 22 preferably includes a development roller 38. Development roller 38 is preferably spaced from photoreceptor 12 thereby forming a gap therebetween of typically 40 to 150 micrometers and is charged to an electrical potential intermediate that of the image and background areas of the image. Development roller 38 is thus operative, when maintained at a suitable voltage, to apply an electric field to aid development of the latent electrostatic image.

Development roller 38 typically rotates in the same sense as drum 10 as indicated by arrow 40. This rotation provides for the surface of sheet 12 and development roller 38 to have opposite velocities at the gap between them.

Multicolor liquid developer spray assembly 20, whose operation and structure is described in detail in U.S. Pat. No. 5,117,263, the disclosure of which is incorporated herein by reference, may be mounted on axis 42 to allow assembly 20 to be pivoted in such a manner that a spray of liquid toner containing electrically charged pigmented toner particles can be directed either onto a portion of the development roller 38, a portion of the photoreceptor 12 or directly into a development region 44 between photoreceptor 12 and development roller 38. Alternatively, assembly 20 may be fixed. Preferably, the spray is directed onto a portion of the development roller 38.

Color specific cleaning blade assemblies 34 are operatively associated with developer roller 38 for separate removal of residual amounts of each colored toner remaining thereon after development. Each of blade assemblies 34 is selectably brought into operative association with developer roller 38 only when toner of a color corresponding thereto is supplied to development region 44 by spray assembly 20. The construction and operation of cleaning blade assemblies is described in PCT Publication WO 90/14619 and in U.S. Pat. No. 5,289,238, the disclosures of which are incorporated herein by reference.

Each cleaning blade assembly 34 includes a toner directing member 52 which serves to direct the toner removed by the cleaning blade assemblies 34 from the developer roller 38 to separate collection containers 54, 56, 58, and 60 for each color to prevent contamination of the various developers by mixing of the colors. The toner collected by the collection containers is recycled to a corresponding toner reservoir (55, 57, 59 and 61). A final toner directing member 62 always engages the developer roller 38 and the toner collected thereat is supplied into collection container 64 and thereafter to reservoir 65 via separator 66 which is operative to separate relatively clean carrier liquid from the various colored toner particles. The separator 66 may be typically of the type described in U.S. Pat. No. 4,985,732, the disclosure of which is incorporated herein by reference.

In a preferred embodiment of the invention, as described in U.S. Pat. No. 5,255,058, the disclosure of which is incorporated herein by reference, where the imaging speed is very high, a background cleaning station 24 typically including a reverse roller 46 and a fluid spray apparatus 48 is provided. Reverse roller 46 which rotates in a direction indicated by arrow 50 is electrically biased to a potential intermediate that of the image and background areas of photoconductive drum 10, but different from that of the development roller. Reverse roller 46 is preferably spaced apart from photoreceptor sheet 12 thereby forming a gap therebetween which is typically 40 to 150 micrometers.

Fluid spray apparatus 48 receives liquid toner from reservoir 65 via conduit 88 and operates to provide a supply of preferably non-pigmented carrier liquid to the gap between sheet 12 and reverse roller 46. The liquid supplied by fluid spray apparatus 48 replaces the liquid removed from drum 10 by development assembly 22 thus allowing the reverse roller 46 to remove charged pigmented toner particles by electrophoresis from the background areas of the latent image. Excess fluid is removed from reverse roller 46 by a liquid directing member 70 which continuously engages reverse roller 46 to collect excess liquid containing toner particles of various colors which is in turn supplied to reservoir 65 via a collection container 64 and separator 66.

The apparatus embodied in reference numerals 46, 48, 50 and 70 is not required for low speed systems, but is preferably included in high speed systems.

Preferably, an electrically biased squeegee roller 26 is urged against the surface of sheet 12 and is operative to remove liquid carrier from the background regions and to compact the image and remove liquid carrier therefrom in the image regions. Squeegee roller 26 is preferably formed of resilient slightly conductive polymeric material as is well known in the art, and is preferably charged to a potential of several hundred to a few thousand volts with the same polarity as the polarity of the charge on the toner particles.

Discharge device 28 is operative to flood sheet 12 with light which discharges the voltage remaining on sheet 12, mainly to reduce electrical breakdown and improve transfer of the image to intermediate transfer member 30. Operation of such a device in a write black system is described in U.S. Pat. No. 5,280,326, the disclosure of which is incorporated herein by reference.

FIGS. 1 and 2 further show that multicolor toner spray assembly 20 receives separate supplies of colored toner typically from four different reservoirs 55, 57, 59 and 61. FIG. 1 shows four different colored toner reservoirs 55, 57, 59 and 61 typically containing the colors Yellow, Magenta, Cyan and, optionally, Black respectively. Pumps 90, 92, 94 and 96 may be provided along respective supply conduits 98, 101, 103 and 105 for providing a desired amount of pressure to feed the colored toner to multicolor spray assembly 20. Alternatively, multicolor toner spray assembly 20, which is preferably a three level spray assembly, receives supplies of colored toner from up to six different reservoirs (not shown) which allows for custom colored tones in addition to the standard process colors.

A preferred type of toner for use with the present invention is that described in Example 1 of U.S. Pat. No. 4,794, 651, the disclosure of which is incorporated herein by reference or variants thereof as are well known in the art. For colored liquid developers, carbon black is replaced by color pigments as is well known in the art. Other toners may alternatively be employed, including liquid toners and, as indicated above, including powder toners. Preferred liquid toners are also described in the various patents and patent applications referred to herein and/or incorporated herein by reference, which also include additional details of preferred embodiments of apparatus, methods and toners utilizing the present invention.

The electric power which charges developer roller 38 and reverse roller 46 is preferably controlled by a brightness voltage supply 204 as described below.

Intermediate transfer member 30 may be any suitable intermediate transfer member having a multilayered transfer portion such as those described below or in U.S. Pat. Nos. 5,089,856 or 5,047,808 or in U.S. patent application Ser. No. 08/371,117, filed Jan. 11, 1995 and entitled IMAGING APPARATUS AND INTERMEDIATE TRANSFER BLANKET THEREFOR the disclosure of which is incorporated herein by reference. Member 30 is maintained at a suitable voltage and temperature for electrostatic transfer of the image thereto from the image bearing surface. Intermediate transfer member 30 is preferably associated with a pressure roller 71 for transfer of the image onto a final substrate 72, such as paper, preferably by heat and pressure.

Cleaning apparatus 32 is operative to scrub clean the surface of photoreceptor 12 and preferably includes a cleaning roller 74, a sprayer 76 to spray a non-polar cleaning liquid to assist in the scrubbing process and a wiper blade 78 to complete the cleaning of the photoconductive surface. Cleaning roller 74, which may be formed of any synthetic resin known in the art, for this purpose is driven in the same sense as drum 10 as indicated by arrow 80, such that the surface of the roller scrubs the surface of the photoreceptor. Any residual charge left on the surface of photoreceptor sheet 12 may be removed by flooding the photoconductive surface with light from optional neutralizing lamp assembly 36, which may not be required in practice.

In accordance with a preferred embodiment of the invention, after developing each image in a given color, the single color image is transferred to intermediate transfer member 30. Subsequent images in different colors are sequentially transferred in alignment with the previous image onto intermediate transfer member 30. When all of the desired images have been transferred thereto, the complete multi-color image is transferred from transfer member 30 to substrate 72. Impression roller 71 only produces operative engagement between intermediate transfer member 30 and substrate 72 when transfer of the composite image to substrate 72 takes place. Alternatively, each single color image is separately transferred to the substrate via the intermediate transfer member. In this case, the substrate is fed through the machine once for each color or is held on a platen and contacted with intermediate transfer member 30 during image transfer. Alternatively, the intermediate transfer member is omitted and the developed single color images are transferred sequentially directly from drum 10 to substrate 72.

It should be understood that the invention is not limited to the specific type of image forming system used and the present invention is also useful with any suitable imaging system which forms a liquid toner image on an image forming surface and, for some aspects of the invention, with powder toner systems. The specific details given above for the image forming system are included as part of a best mode of carrying out the invention, however, many aspects of the invention are applicable to a wide range of systems as known in the art for electrophotographic printing and copying.

Figure 3:
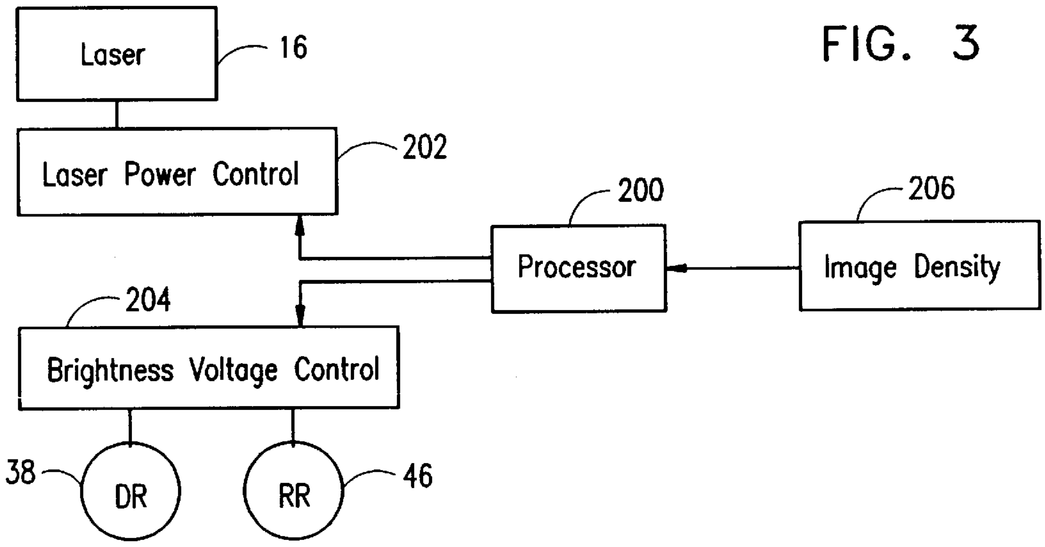
FIG. 3 is a schematic, block diagram, illustration of a color adjustment system in accordance with the present invention.

Reference is now made also to FIG. 3 which schematically illustrates a color adjustment system in accordance with a preferred embodiment of the present invention. The color adjustment system includes a processor 200 which controls the operation of power supply 202 and brightness voltage supply 204, using appropriate control signals, as described below. Power supply 202 controls the output power of the laser or LEDs in scanning apparatus 16 by controlling the electric power supplied to the scanning apparatus, in accordance with the control signals from processor 200. Brightness voltage supply 204 controls the voltages on developer roller 38 and on reverse roller 46, in accordance with the control signals from processor 200, but maintains the voltage between developer roller 38 and reverse roller 46, i.e. the operating window, substantially constant. The operation of reverse roller 46 is described more fully in U.S. Pat. No. 5,255,058, the disclosure of which is incorporated herein by reference.

It should be noted that use of reverse roller 46, primarily in high speed printers, is optional and that the present invention is also applicable to systems not including a reverse roller, in which brightness voltage supply controls only the voltage on developer roller 38.

In accordance with the present invention, processor 200 is preferably associated with an image density sensor 206 which measures the optical density of different test images produced by the imaging apparatus, as described below, and provides corresponding electric inputs to processor 200. Image density sensor 206 is preferably mounted at a fixed location with respect to pressure roller 71, so as to be juxtaposed with a printed portion of final substrate 72 as shown in FIG. 2. Alternatively, sensor 206 can be mounted to view an image as formed on photoreceptor 12 or on intermediate transfer member 30.

Processor 200 compares the inputs from sensor 206 to predetermined, desired, image characteristics and, based on this comparison, determines the required corrections in brightness voltage (BV) and in laser or LED power (LP) for each color. Processor 200 generates the above mentioned control signals in response to the required corrections, as described below with reference to FIGS. 4A and 4B.

Figure 4A:
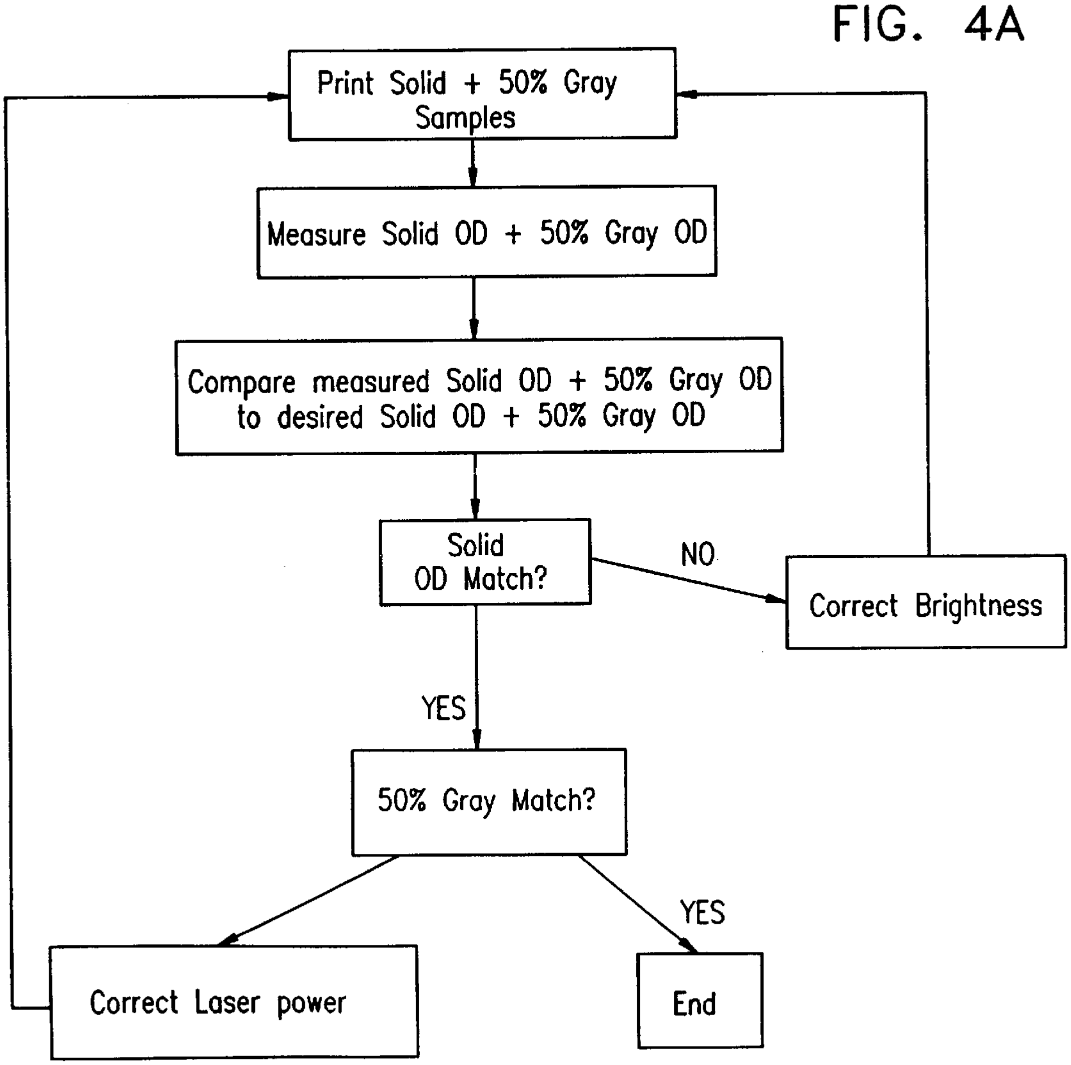
FIG. 4A is a schematic flow chart illustrating an iterative adjustment procedure in accordance with a preferred embodiment of the present invention.

Reference is now made also to FIG. 4A which schematically illustrates an iterative adjustment procedure, used by processor 200 in accordance with one, preferred, embodiment of the present invention. The iterative procedure outlined in FIG. 4A is applicable to any and all of the base colors involved in the printing process, e.g. cyan, magenta, yellow and black, or to other colors. The procedure can be applied to the different colors either consecutively, whereby the entire procedure is applied to adjust a given color before being applied to the next color, or in parallel, whereby a given iteration is applied to all the base colors before the next iteration is applied.

Figure 5A:
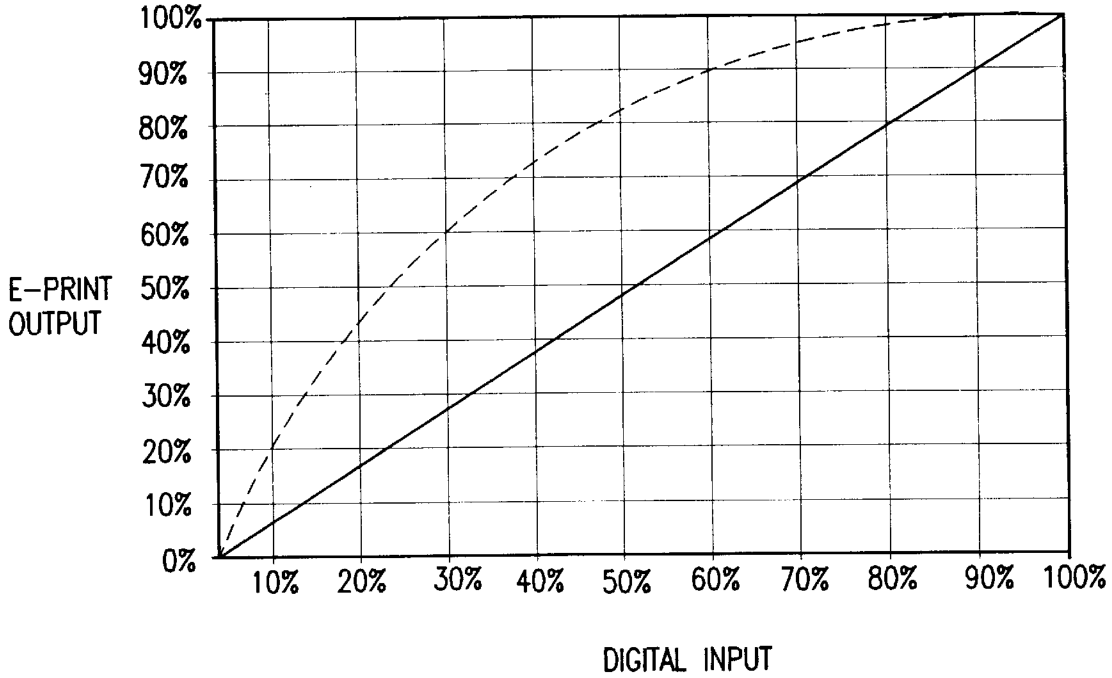
FIG. 5A is a schematic illustration of typical, normal and cromalin, LUT curves.

Referring to FIGS. 3 and 4A, the apparent optical densities of a solid test sample and a 50 percent input gray test sample of a given color are printed and measured, consecutively or in parallel, by image sensor 206 and corresponding signals are generated and sent to processor 200. Processor 200 then compares the measured optical densities to corresponding, desired, optical densities which are preferably stored in a memory associated with processor 200. The stored optical densities have predetermined values representing predetermined image characteristics, i.e. solid optical density and look up table (LUT). For example, if the LUT is as illustrated schematically by the upper curve of FIG. 5A, the desired density of the 50 percent input gray level is equal to approximately 75 percent of the solid density, i.e. a 75 percent dot area. Alternatively, the comparison can be made with a value already corrected for a typical system dot gain.

Figure 5B:
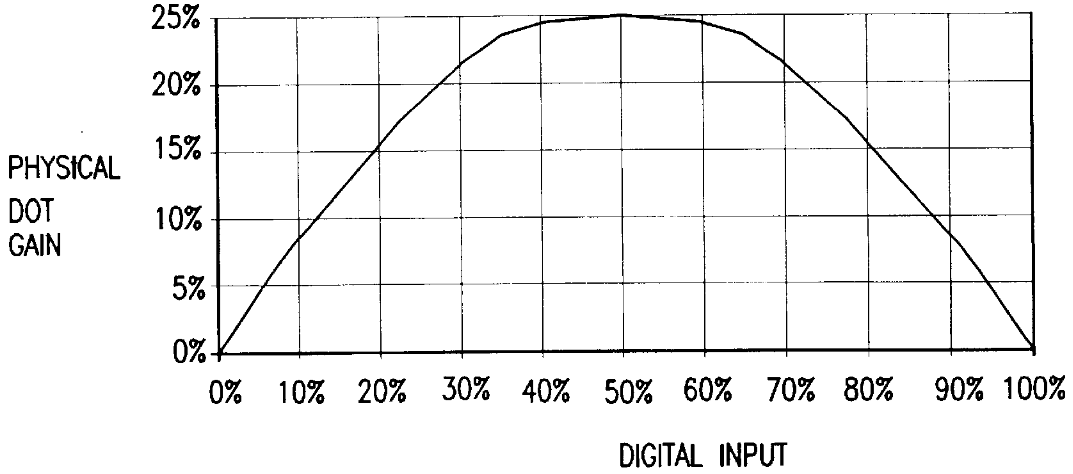
FIG. 5B is a schematic illustration of a typical dot gain curve.

FIG. 5B schematically illustrates a typical dot gain curve. As shown clearly in FIG. 5B, the dot gain generally reaches a maximum at a digital input level of 50 percent gray. Thus, the 50 percent gray level is particularly useful for color adjustment since at this level inaccuracies in dot gain are the most apparent.

Reference is made back to FIGS. 3 and 4A. If the measured solid density does not match the desired solid density, processor 200 generates a brightness control signal to brightness voltage supply 204 which changes the brightness voltage, i.e. the voltages of developer roller 38 and reverse roller 46 (if present), accordingly. After the brightness voltage has been changed, new test samples are printed, measured by density sensor 206 and compared by processor 200, as described above. Then, if the measured 50 percent gray density does not match the desired value, as determined from the appropriate LUT, processor 200 generates a power control signal to power supply 202 which, accordingly, changes the power output of scanner 16.

If both the solid density and the gray level density match the desired value, the adjustment process is completed. If either the brightness voltage or the laser power are changed, the adjustment procedure proceeds to a second iteration, in which new test samples are printed and remeasured by sensor 206, and the above mentioned sequence is repeated. The adjustment procedure is preferably repeated until a desired level of accuracy (i.e., the difference from the desired value is below a predetermined threshold) is obtained for both the solid density and the 50 percent gray density. Additionally or alternatively, the adjustment procedure may include a predetermined number of iterations as normally required to obtain the desired accuracy.

Figure 4B:
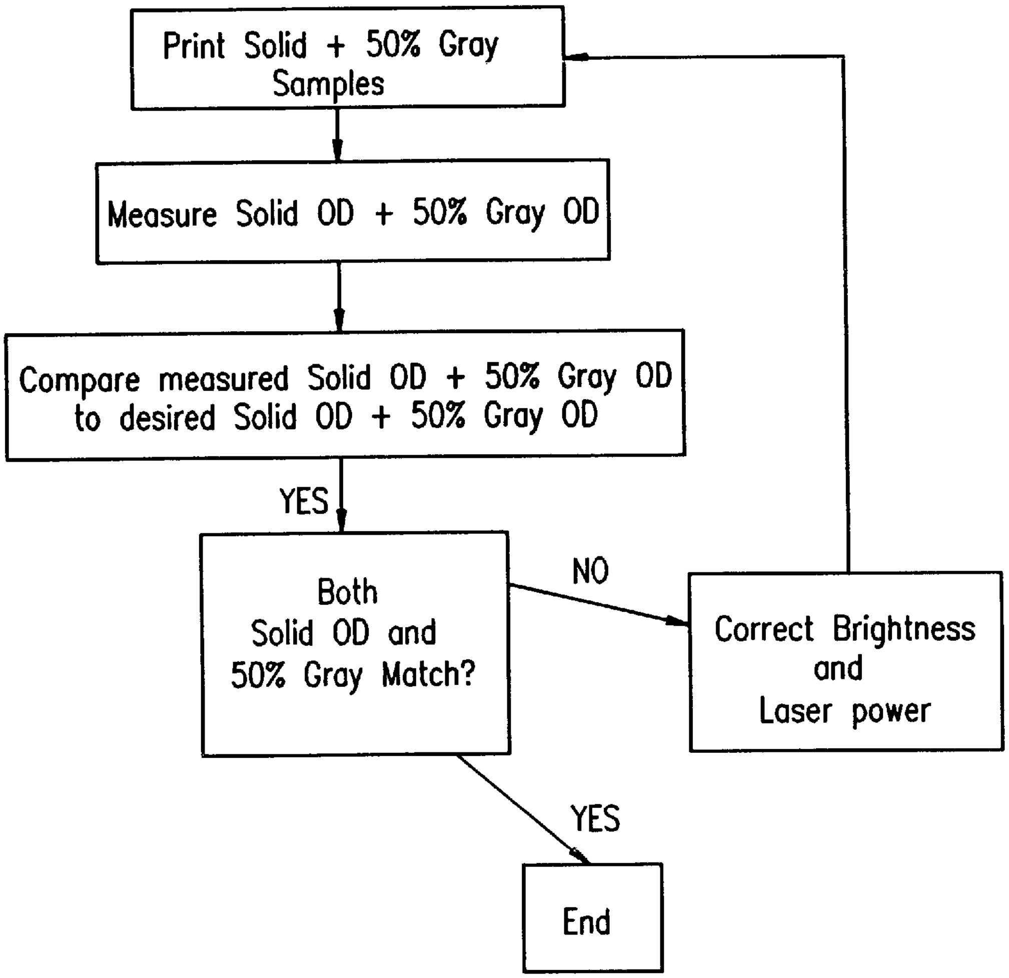
FIG. 4B is a schematic flow chart illustrating an adjustment procedure in accordance with an alternative preferred embodiment of the present invention.

In an especially preferred embodiment of the invention, as shown in FIG. 4B, both the scanner power and the brightness voltage are changed simultaneously. In this method, after printing the test pattern, both the solid OD and the gray level OD are measured and compared to a desired value. If they are the same, no recalibration is necessary. If they are different, then the following equations are solved for the desired change in laser power (δP) and brightness voltage (δV):

$$OD(\text{solid})+\delta V\cdot(dOD(\text{solid})/dV)+\delta P\cdot(dOD(\text{solid})/dP)=\text{desired } OD(\text{solid})$$

and $$OD(\text{gray})+\delta V\cdot(dOD(\text{gray})/dV)+\delta P\cdot(dOD(\text{gray})/dP)=\text{desired } OD(\text{gray}).$$

The derivatives dOD(solid)/dV, dOD(solid)/dP, dOD (gray)/dV and dOD(gray)/dP are measured or calculated partial derivatives of the respective ODs with respect to the brightness voltage or laser or LED power.

In a practical version of the invention, the derivatives are the first order (linear) fit to the curves of OD with respect to the variable in question.

In an alternative embodiment of the present invention, the adjustment procedure of FIG. 4A or FIG. 4B is carried out semi-automatically, whereby the operation of density sensor 206 is controlled by a user of the imaging apparatus. According to this embodiment of the invention, the number of iterations in the adjustment procedure is determined by the number of times the user operates density sensor 206 to measure the color density of printed samples. In one variation of this embodiment of the invention, density sensor 206 is included in a hand-held device which is applied to user-selected locations on the printed samples. In another variation of this embodiment of the invention, density sensor 206 is fixedly mounted on the imaging apparatus so as to be juxtaposed with the printed final substrate 72, or with the image formed on photoreceptor 12 or on intermediate transfer member 30, as shown in FIG. 2.

Figure 6:
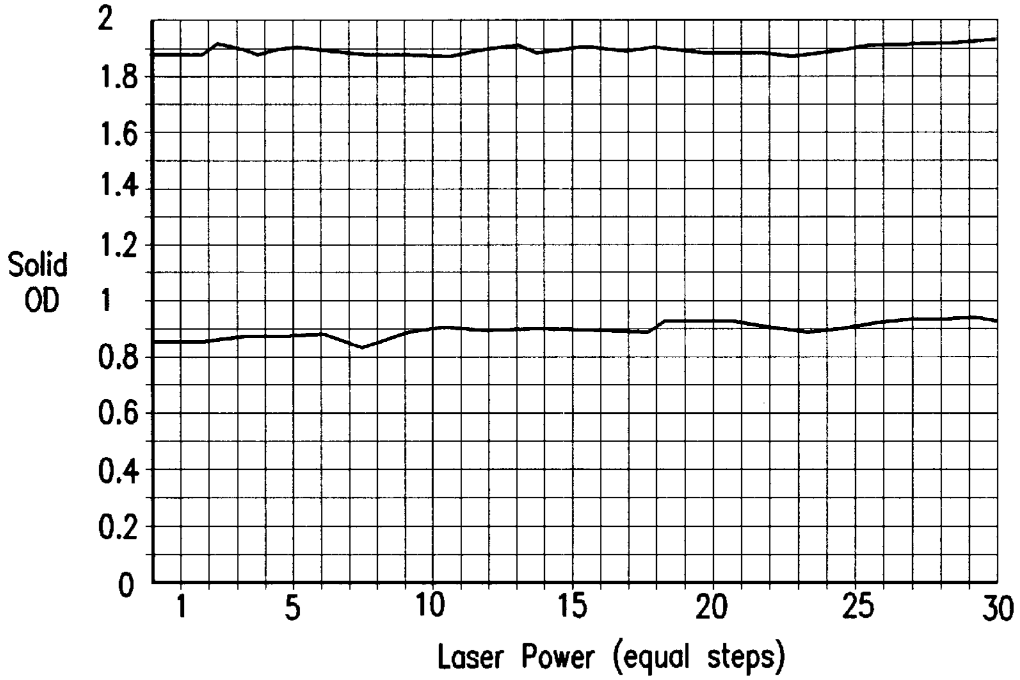
FIG. 6 is a schematic illustration of curves showing black and yellow optical densities as a function of brightness voltage.
Figure 9:
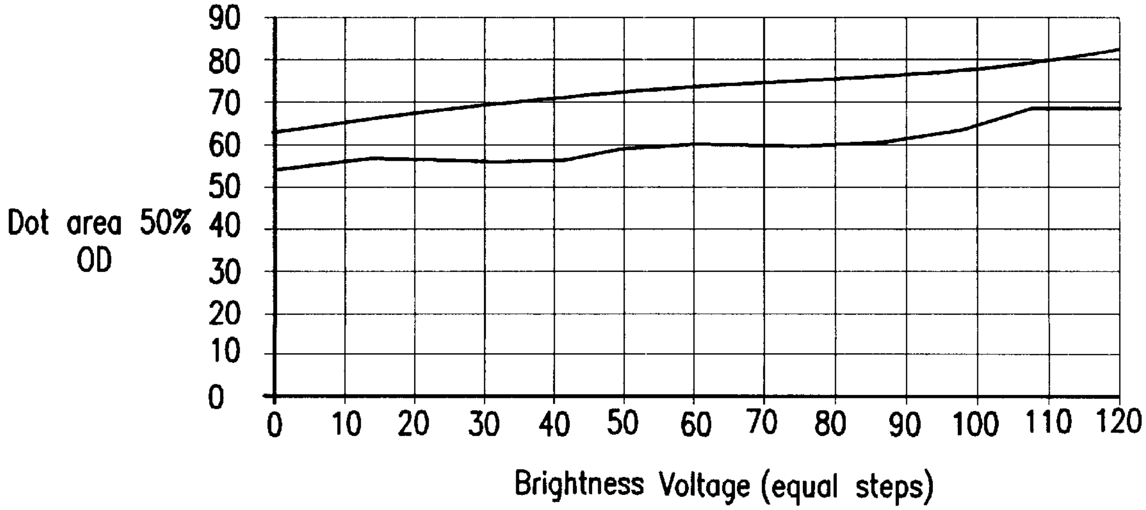
FIG. 9 is a schematic illustration of curves showing black and yellow dot gain as a function of laser power for a 50 percent gray level input.
Figure 8:
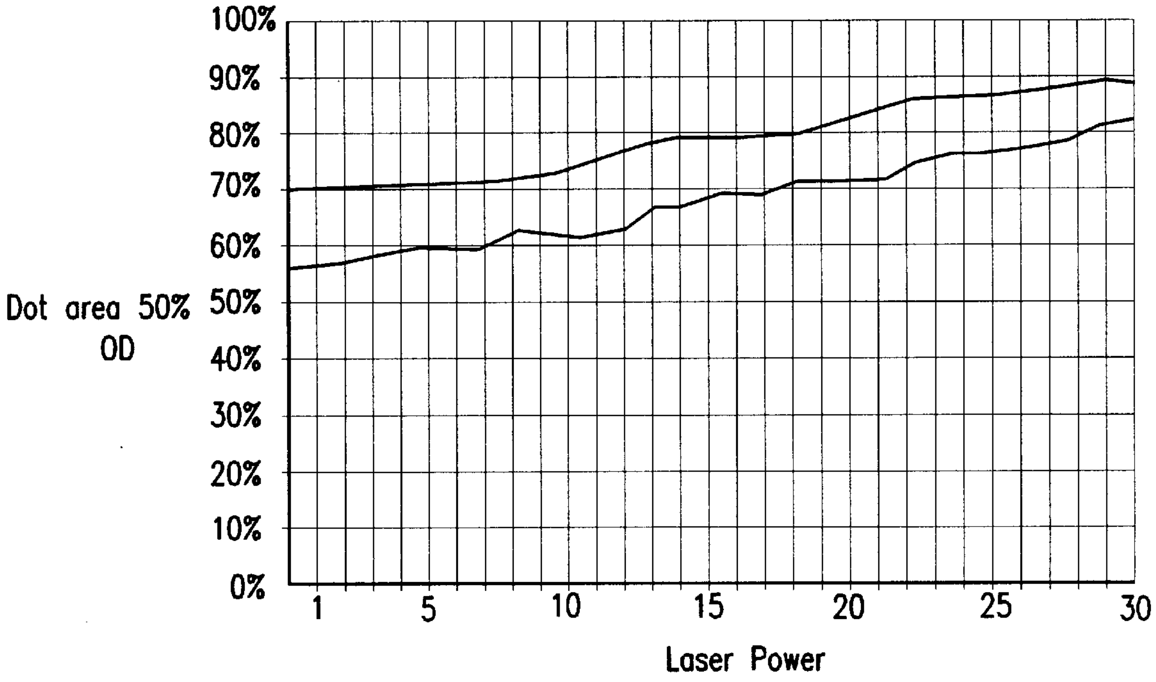
FIG. 8 is a schematic illustration of curves showing black and yellow dot gain as a function of brightness voltage for a 50 percent gray level input.
Figure 7:
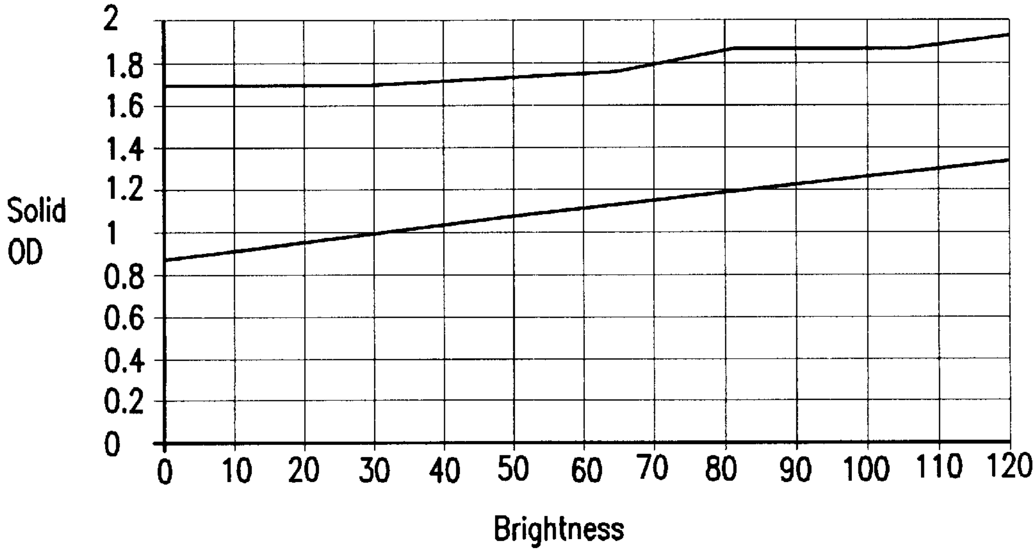
FIG. 7 is a schematic illustration of curves showing black and yellow optical densities as a function laser power.

FIGS. 6–9 schematically illustrate solid OD and the OD of 50 percent gray (shown as the dot area) as functions of applied brightness voltage and laser power. FIG. 6 shows OD as a function of laser power; FIG. 7 shows solid OD as a function of brightness voltage; FIG. 8 shows the OD of 50% gray as a function of laser power; and FIG. 9 shows the OD of 50% gray as a function of brightness voltage. In a preferred embodiment of the invention, the relationships shown in FIGS. 6–9 are used by processor 200 to determine the appropriate brightness voltage and power corrections. In each of FIGS. 6–9, the upper curve corresponds to black printing and the bottom curve corresponds to yellow printing. It should be appreciated that the curves of other printed colors, e.g. cyan and magenta, are similar.

FIGS. 6–9 show that while the effective dot area of the 50 percent gray level is substantially linearly dependent on both the laser power and the brightness voltage, the optical density of the image is controlled substantially only by the brightness voltage. Therefore, the sequence described above, whereby the brightness voltage adjustment is performed prior to the laser power adjustment, is the preferred sequence. Once the desired optical density is achieved, using brightness voltage control, the same optical density is maintained albeit subsequent variation of the laser power.

Alternatively, the method of FIG. 4B already takes into account the variations of the ODs with both the brightness voltages and the laser or LED power.

It should be understood, that while the invention is described using variations in the gray level OD, measurements on and adjustments to the dot size could be made by varying the power level. This variant is the based on FIGS. 8 and 9. It should be understood that the gray level OD curves will be similar in form to FIGS. 8 and 9.

As known in the art, the look up table (LUT) used by the imaging apparatus preferably includes a transformation from cromalin dot gain to the dot gain of the imaging apparatus. When such a LUT is used, the imaging apparatus is compatible with digital inputs which have already been corrected for cromalin.

It will be appreciated by persons skilled in the art that the present invention is not limited by the description and example provided hereinabove. Rather, the scope of this invention is defined only by the claims which follow:

We claim:

1. A method of adjusting imaging apparatus comprising the steps of:

(a) charging a photoreceptor surface to a first voltage;

(b) selectively discharging portions of the charged photoreceptor surface, with a controllable amount of electromagnetic energy, to form a predefined electrostatic latent test image on the photoreceptor surface;

(c) developing, using a second voltage different from the first voltage, a layer of charged toner particles onto the selectively discharged portions of the photoreceptor surface, providing a developed test image corresponding to the latent test image;

(d) measuring the effective optical density of portions of the developed test image including a solid print portion and a predetermined print halftone portion;

(e) comparing the measured solid and halftone optical densities with predetermined, desired, solid and halftone optical densities;

(f) determining as a first rate of change, a rate of change of a printed solid optical density with the second, development, voltage;

(g) determining as a second rate of change, a rate of change of a printed halftone optical density with the second, development, voltage;

(h) determining as a third rate of change, a rate of change of a printed solid optical density with the electromagnetic energy;

(i) determining as a fourth rate of change, a rate of change of a printed halftone optical density with the electromagnetic energy; and (j) adjusting the second voltage and the electromagnetic energy based on a comparison between the measured and desired solid and halftone optical densities and the determined first, second, third and fourth rates of change.

2. A method according to claim 1 and further comprising:

(g) repeating (a)–(j) until the differences between the measured and the desired solid and halftone optical densities drop under preselected, respective, thresholds.

3. A method according to claim 1 wherein the electromagnetic energy is in the form of a laser beam.

4. A method according to claim 1 and including the step of providing the output of at least one LED to form said electromagnetic energy.

5. A method according to claim 1 wherein measuring the effective optical density comprises measuring the effective optical density on the photoreceptor.

6. A method according to claims 1 and further comprising the step of transferring at least a portion of the developed test image from the photoreceptor surface onto a further surface.

7. A method according to claim 6 wherein measuring the effective optical density comprises the step of measuring the apparent optical density transferred portion on the further surface.

8. A method according to claim 7 wherein the further surface comprises a final substrate.

9. A method according to claim 7 wherein the further surface comprises the surface of an intermediate transfer member.

10. A method according to claim 1 wherein the predetermined halftone comprises a 50 percent input halftone.

11. A method of adjusting imaging apparatus comprising the steps of:

(a) charging a photoreceptor surface to a first voltage;

(b) selectively discharging portions of the charged photoreceptor surface, with a controllable amount of electromagnetic energy, to form a predefined electrostatic latent test image on the photoreceptor surface;

(c) developing, using a second voltage different from the first voltage, a layer of charged toner particles onto the selectively discharged portions of the photoreceptor surface, providing a developed test image corresponding to the latent test image;

(d) measuring the effective optical density of a solid print portion of the developed test image;

(e) comparing the measured solid optical density with a predetermined, desired, solid optical density;

(f) if a difference between the measured effective solid optical density and the desired solid optical density is above a preselected threshold, the following substeps occur:

(f1) adjusting the second voltage according to the difference between the measured effective solid optical density and the desired solid optical density; and (f2) repeating (a)–(f1);

(g) measuring the effective optical density of a predetermined halftone portion of the developed test image;

(h) comparing the measured predetermined halftone optical density with a predetermined, desired, predetermined halftone optical density; and (I) if a difference between the measured effective predetermined halftone optical density and the desired predetermined halftone optical density is above a preselected threshold, the following substeps occur:

(i1) adjusting the electromagnetic energy according to the difference between the measured effective predetermined halftone optical density and the desired predetermined halftone optical density; and (i2) repeating (a)–(i1).

12. A method according to claim 11 wherein the electromagnetic energy is in the form of a laser beam.

13. A method according to claim 11 wherein the electromagnetic energy comprises the output of at least one LED.

14. A method according to claim 11 wherein the step of measuring the effective optical density comprises measuring the effective optical density on the photoreceptor.

15. A method according to claim 11 and further comprising the step of transferring at least a portion of the developed test image from the photoreceptor surface onto a further surface.

16. A method according to claim 15 wherein the step of measuring the effective optical density comprises measuring the effective optical density transferred portion on the further surface.

17. A method according to claim 15 wherein the further surface comprises a final substrate.

18. A method according to claim 15 wherein the further surface comprises the surface of an intermediate transfer member.

19. A method according to claim 11 wherein the predetermined desired halftone comprises a 50 percent input halftone.

* * * * *

UNITED STATES PATENT AND TRADEMARK OFFICE

CERTIFICATE OF CORRECTION

PATENT NO. : 5,864,353
DATED : January 26, 1999
INVENTOR(S) : O. GILA et al.

It is certified that error appears in the above-identified patent and that said Letters Patent is hereby corrected as shown below:

At column 12, line 64 (claim 2, line 2) of the printed patent, "(a)-(j) until the" should be --(a)-(e) and (j) until--.

At column 13, line 9 (claim 5, line 3) of the printed patent, after "photoreceptor" insert --surface--.

Signed and Sealed this

Twenty-second Day of February, 2000

*Attest:*

Q. TODD DICKINSON

*Attesting Officer* *Commissioner of Patents and Trademarks*